United States Patent [19]

Neubert et al.

[11] Patent Number: 4,711,424
[45] Date of Patent: Dec. 8, 1987

[54] COMBINATION ENERGY ABSORBING FOUNDATION

[75] Inventors: Vernon H. Neubert, Centre Hall, Pa.; Nicholas Perrone, Laurel, Md.

[73] Assignee: The United States of America as represented by the Secretary of the Navy, Washington, D.C.

[21] Appl. No.: 383,871

[22] Filed: Jun. 1, 1982

[51] Int. Cl.$^4$ .............................................. F16M 13/00
[52] U.S. Cl. ..................................... 248/636; 188/371
[58] Field of Search ............... 248/562, 568, 569, 570, 248/636; 188/371, 377; 267/140.1; 52/801, 671

[56] References Cited

U.S. PATENT DOCUMENTS

| 2,211,416 | 8/1940 | Goldsmith | 248/562 X |
| 2,572,919 | 10/1951 | French et al. | 248/562 |
| 2,635,838 | 4/1953 | Branson | 248/562 |
| 3,204,913 | 9/1965 | Lawrence et al. | 248/568 X |
| 3,444,962 | 5/1969 | Lech | 188/371 |
| 3,459,395 | 8/1969 | Scotto | 248/562 X |
| 3,735,952 | 5/1973 | Platus et al. | 248/562 |
| 3,912,248 | 10/1975 | Pickford et al. | 248/600 X |

FOREIGN PATENT DOCUMENTS

| 3005983 | 8/1981 | Fed. Rep. of Germany | 248/562 |
| 2375496 | 8/1978 | France | 188/377 |

Primary Examiner—Ramon S. Britts
Assistant Examiner—Sarah A. Lechok Eley
Attorney, Agent, or Firm—Prithvi C. Lall; Arthur A. McGill; Michael J. McGowan

[57] ABSTRACT

An energy-absorbing foundation provides both large and small scale absorption of mechanical energy over a broad frequency band using a combination of linear and non-linear energy-absorbing means positioned between a region where the energy arises and another region where personnel and property may be located. The linear and non-linear energy absorbing means may be connected in series or in parallel and act as a mechanical fuse and shock snubber, respectively. One embodiment uses a double reverse corrugate metal and another embodiment uses side loaded tubes as the non-linear energy absorbing component of the disclosed energy-absorbing foundation. Elastic springs may be used in both embodiments as the linear energy absorbing component.

6 Claims, 11 Drawing Figures

COMBINATION ENERGY ABSORBING FOUNDATION

BACKGROUND OF THE INVENTION

This invention is drawn to the field of mechanical energy absorbing devices, and more particularly, to a novel energy absorbing configuration that uniformly absorbs mechanical energy over a broad frequency band and a wide amplitude range.

Mechanical energy is released under a variety of circumstances including nuclear and conventional weapon detonation and collisions between two massive bodies such as marine vessels, among others. The energy propagates and, if unchecked, encounters property and personnel causing equipment damage and a threat to life and safety. A variety of mechanical energy impeding devices have been positioned between the region where the mechanical energy arises and the region where either the personnel or the equipment are located in an effort to keep the magnitude of the transmitted acceleration and load within acceptable bounds.

The stress-strain curves for honeycomb, a common energy absorbing device, have a large initial peak, called the compressive strength, at which buckling begins, and then oscillate about a fairly flat average. The oscillations are due to the successive formation and bottoming out of new pleats; the honeycomb deforms in an accordian-like fashion.

The frangible tube as an energy-absorbing device applies an axial load to one end of the tube while the other end is pressed over a die. The die is shaped so that the portion of the tube in contact with the die is split into segments and the segments are broken into small fragments. A fluctuating force is developed, but the average force is approximately constant.

The inverting tube as an energy absorbing device is an axially loaded tube having a flair on one end. The flaired end is rigidly clamped and the tube is turned inside-out by pushing the tube through the flaired end. The load-deflection curves are flat. In order to increase the energy absorbing capability of this type of device, "drag" elements around the outside of the tube may be added whereby the total energy loss can be made to be several times greater than that lost due to inverting only.

The linear spring elastic energy impeding device typically comprises a preselected length of helically turned wire which is enclosed in a cylindrical housing. Another type is a preselected length of a braided stainless steel wire rope closed upon itself.

Several problems are encountered in the use of the known mechanical energy impeding devices. The first problem is that many absorbers become stiffer as they are compressed and therefore transmit greater acceleration at higher shock levels. Another problem is that the elastic devices elastically absorb energy and protect equipment during the compression phase, but then they release the energy during the unloading phase which causes rebound problems.

A third problem with some devices is that they are frequency dependent. Certain frequencies of mechanical energy are passed due to the particular loading behavior of the device while others are effectively blocked. This obviously is undesirable for personnel and equipment which would tend to be jerked back and forth and which would be subject to large frequency-dependent peak accelerations. In addition, many of the devices are expensive and considerable alignment difficulties arise to assure that they deform in the prescribed manners. Thus it is desirable to provide an improved energy absorbing mount that is not subject to the disadvantages of the prior techniques.

SUMMARY OF THE INVENTION

The novel energy absorbing foundation of the present invention comprises first elastic means, responsive to mechanical energy, for elastically deforming; and second non-linear means, responsive to mechanical energy and coupled to the first elastic means, for plastically deforming. The elastic mount serves to attenuate small scale deflections and the non-linear mount serves to attenuate large scale deflections. In this manner, transmitted accelerations are kept to a minimum over a broadband of mechanical energy frequencies and over a wide latitude in amplitudes.

According to one feature of the present invention, the elastic mount is serially connected with the non-linear mount. This arrangement transmits mechanical energy therethrough up to a certain plateau, then levels off, thus acting as a mechanical fuse.

According to another feature of the present invention, the first elastic means is positioned in parallel with the second non-linear means. When the amplitude of the mechanical force goes above a certain magnitude, the second non-linear means begins to plastically deform and absorb energy thus acting as a shock snubber, while below that magnitude, the first elastic means dominates A principal advantage of the series arrangement is that the magnitude of the transmitted acceleration through the mount is comparatively less than that for the parallel configuration. A principal advantage of the parallel arrangement is that less space is required for the mount in those situations where space is at a premium such as in an underwater vessel.

According to one embodiment of the present invention, the second non-linear means for plastically deforming in response to incident mechanical energy suitably may comprise one or more low carbon steel tubes having such a ductility that they do not crack when deformed. The tubes are so aligned that loads may be applied to the side of the tube in three directions: compression, in the direction of a diameter of the tube; shear, tangent to the tube surface and parallel to the tube axis; and roll, tangent to the tube surface but perpendicular to the axis. Applied mechanical loading deforms the tubes such that plastic hinges form at the quarter points. The tubes may then be reshaped for use at another time.

According to another embodiment of the present invention, the second non-linear means for plastically deforming in response to incident mechanical energy suitably may comprise a double reverse corrugate metal. The double reverse corrugate metal comprises a flat metallic sheet pierced by short slits spaced apart in an alternating pattern. Every other section is bent up into a half hexagon shape, while the intermediate sections are bent down into a similar shape. In response to mechanical loading, the half hexagons plastically deform at the 1/6th bend points and absorb mechanical energy. By constraining the perimeter of the double reverse corrugate metal, a two-fold increase in energy absorption is obtained over the unconstrained case at the expense of a high initial peak and a sudden drop off in the stress-strain curve which can be alleviated by precrushing the double reverse corrugate metal. The unconstrained double reverse corrugate metal exhibits an almost ideal bi-linear load deformation characteristic.

In both embodiments, it is preferred that the first elastic means for elastically deforming in response to incident mechanical energy comprise an Aeroflex spring formed by a plurality of strands of steel wire twisted in a helical pattern and closed upon itself to form a loop. Other suitable linear springs may be utilized as well.

Accordingly, it is an object of the present invention to provide a combination energy absorbing mount.

It is another object of the present invention to provide such a mount that absorbs both small and large scale loads.

It is another object of the present invention to provide such a mount that absorbs mechanical energy uniformly over a broad frequency bandwidth and a wide amplitude range and which does not pass frequencies selectively.

It is another object of the present invention to provide such a mount that is characterized by a selectable initial yield strength.

It is another object of the present invention to provide such a mount that absorbs mechanical energy in at least one direction in space.

It is still another object of the present invention to provide such a mount that is inexpensive to manufacture and which may be installed in close quarters.

These and other objects and attendant features of the present invention will become apparent by reference to the appended claims, to the following detailed description of the preferred embodiments, and to the drawings, wherein like parts are similarly designated throughout, and wherein:

It is another object of the present invention to provide such a mount that is characterized by a selectable initial yield strength.

It is another object of the present invention to provide such a mount that absorbs mechanical energy in at least one direction in space.

It is still another object of the present invention to provide such a mount that is inexpensive to manufacture and which may be installed in close quarters.

These and other objects and attendant features of the present invention will become apparent by reference to the appended claims, to the following detailed description of the preferred embodiments, and to the drawings, wherein like parts are similarly designated throughout, and wherein:

DETAILED DESCRIPTION OF THE PREFERRED EMBODIMENTS

Figure 1:
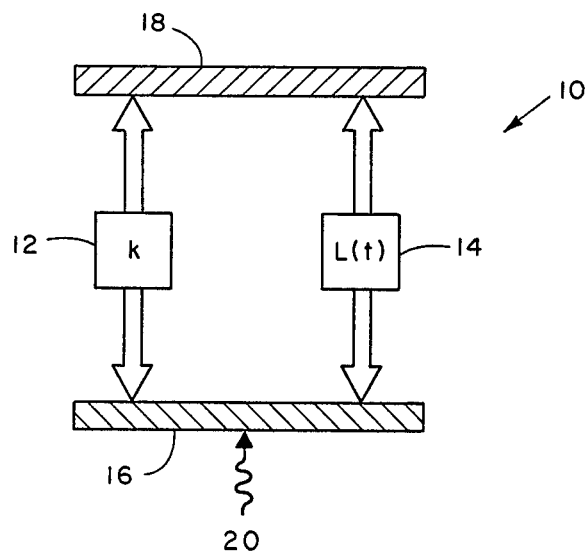
FIG. 1 is a schematic diagram illustrating the novel mechanical energy absorber of the present invention.

Referring now to FIG. 1, generally designated as 10 is a schematic diagram illustrating the novel energy absorbing construction of the present invention. The construction 10 comprises a first elastic means 12, designated by the letter "k", and a second non-linear plastic means 14, designated by the symbol L(t). All linear systems are elastic but some elastic systems are non-linear.

The first and second means 12 and 14 are positioned between a rigid support 16, such as the hull of a ship, and a foundation member 18, such as a base for supporting equipment, not shown. In response to incident mechanical energy designated at 20, both the first elastic means 12 and the second plastic non-linear means 14 deform elastically for small deflections. For large energy inputs, the first elastic means 12 continues to absorb small amounts of energy while the second non-linear means 14 plastically deforms in response to the incident mechanical energy 20 for absorbing large amplitude vibrations and for isolating the base member 18 thereagainst. In this manner, the novel energy absorbing construction 10 of the present invention absorbs a wide range of mechanical energy amplitudes and, as will appear below, serves to uniformly absorb mechanical energy over a broad frequency bandwidth.

Figure 2A:
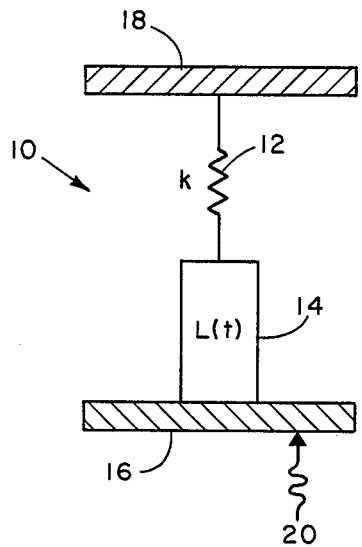
FIG. 2(a) is a schematic diagram illustrating the mechanical fuse feature of the present invention.
Figure 2B:
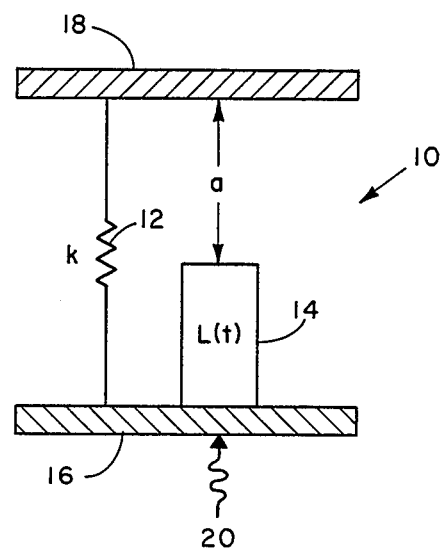
FIG. 2(b) is schematic diagram illustrating the shock snubber feature of the present invention.

According to one feature of the present invention schematically shown in FIG. 2(a), the first linear means 12 for elastically deforming in response to mechanical energy is serially connected with the second non-linear means for plastically deforming 14. For small scale motion of the member 16, the combined elasticity of the members 12 and 14 dominates. As the magnitude of the input load becomes larger, the non-linear means 14 begins to deform. The serial arrangement acts to transmit force up to a preselected threshold at which time the non-linear member 14 begins to plastically deform thus limiting the magnitude of the transmitted force to within acceptable bounds. FIG. 2(b) schematically shows the shock snubber feature of the present invention. In this configuration, the first linear means for elastically deforming 12 is connected in parallel with the second non-linear means for plastically deforming 14. A clearance of "a" inches is provided between the member 14 and the base member 18. When the distance "a" is zero (0), the member 14 is in contact with the member 18. The linear means 12 acts to attenuate the small scale deflections of the incident mechanical energy until such a load is reached that the non-linear means 14 is brought into contact with the member 18 and begins to deform plastically.

As will appear more fully below, the principal advantage of the series arrangement of the present invention is that a greater limitation on the load seen at the member 18 is obtained over that which characterizes the parallel arrangement. The principal advantage of the parallel arrangement is that less space is required to limit the transmitted load than that obtained by the series arrangement. The parallel arrangement is especially attractive where space is at a premium such as in an underwater vessel.

Figure 3:
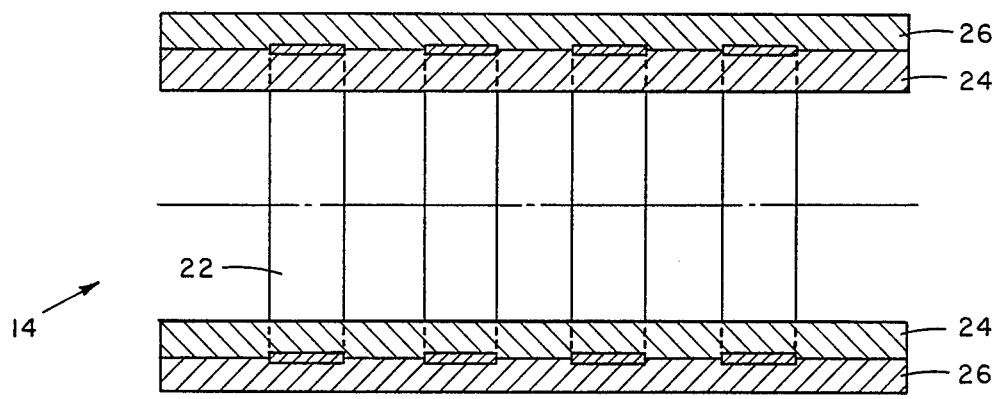
FIG. 3 is a plan view showing one embodiment of an energy absorber according to the present invention.

According to the embodiment shown in FIG. 3, the second non-linear means for plastically deforming comprises a plurality of low carbon steel rings 22 cut from steel tubing. The rings should be very ductile so that they do not crack when deformed. If the steel tubing has been cold worked, then the rings preferably are annealed prior to use; ductile hot extruded low carbon steel tubing may be used directly.

In order to insure that the rings 22 deform in the required manner, first and second metallic bars 24 and 26 are preferably used to clamp and hold the rings together. The metallic bar 24 is provided with a plurality of machined contours in the form of arcuate recesses, not shown, transverse to the long axis of the bar 24 that match the external contour of the rings 22. The bar 26 is preferably provided with a like plurality of square indentations, not shown, transverse to the long axis of the bar 26 and of the same width as the rings 22. The rings are placed in the arcuate recesses of the bar member 24 and in the square indentations of the bar member 26. The bars 24 and 26 may then be fastened together by any suitable means such as by nuts and bolts, not shown.

Figure 4:
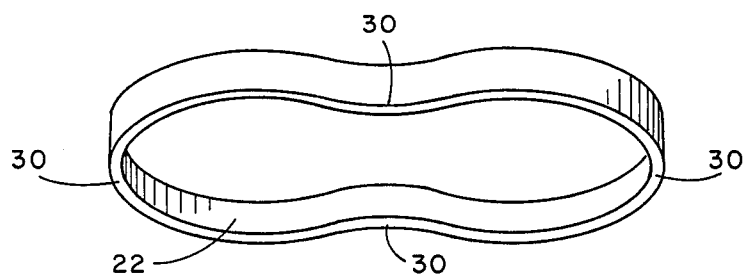
FIG. 4 is an elevational view showing the manner in which the energy absorber of FIG. 3 deforms.

Loads may be applied to the side of the tubes 22 in three directions: compression, in the direction of the diameter of the tube; shear, tangent to the tube surface and parallel to the tube axis; and roll, tangent to the tube surface but perpendicular to the axis. FIG. 4 shows the typical peanut shape into which the rings 22 deform when compressed. The peanut shape arises out of the deformation of the rings at the quarter plastic hinges 30.

The deformation ($\Delta$) of the ring 22 is related to the applied load ($P_0$) and average ring diameter (d) by the relation $P = P_0/(1-(\Delta/d)^2)$, provided $\Delta$ is less than d/2. The load $P_0$ is the load at which the rings begin to deform as a mechanism after formation of the plastic hinges 30 at the quarter points. The energy absorbed is approximately $3\sigma_o t^2 W$, where $\sigma_o$ is the yield stress, t is the thickness of the ring, and W is the width of the ring. It has been found that the deformation behavior of the rings absorbs mechanical energy uniformly over a broad band of mechanical energy frequencies thus avoiding the potentially deleterious effects of selective frequency passing of the prior art devices.

Figure 5A:
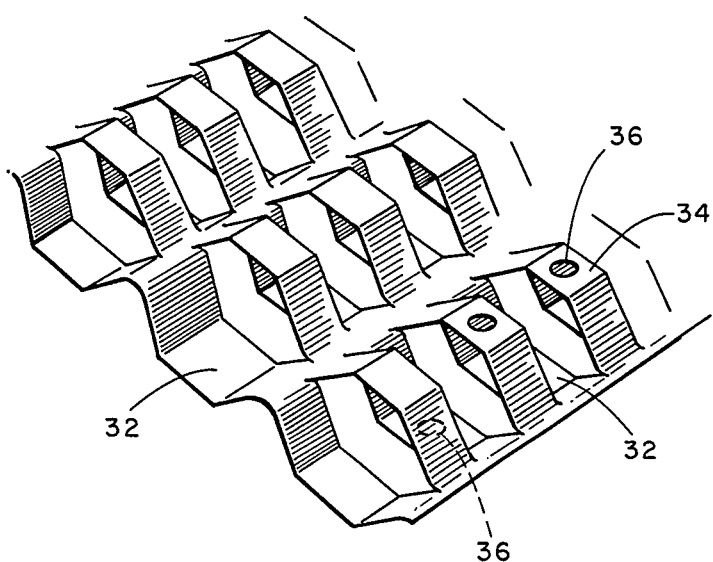
FIG. 5(a) is a perspective view and FIG. 5(b) is a plan view showing a second embodiment of an energy absorber according to the present invention.
Figure 5B:
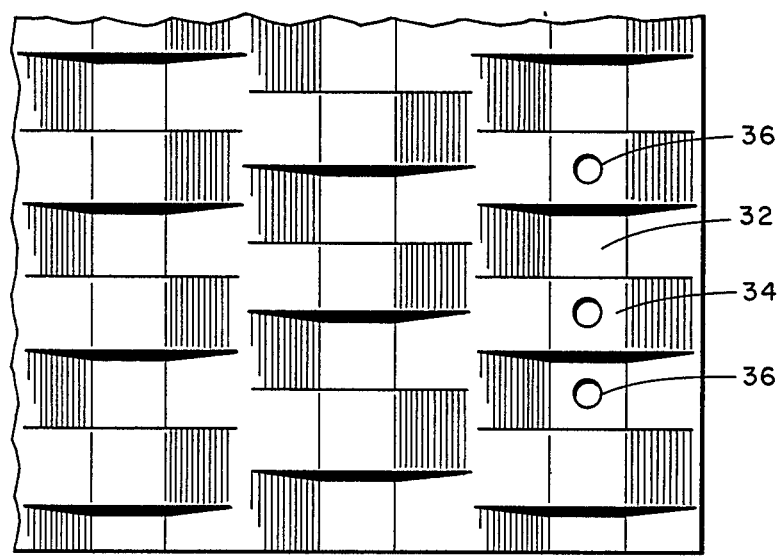

FIG. 5 shows a perspective view of a second embodiment of the second non-linear means for plastically deforming in response to incident mechanical energy of the present invention. The second embodiment comprises a plane sheet of carbon steel with a carbon content preferably less than 0.25%. The flat sheet steel is pierced by short slits preferably ½ inch apart in an alternating pattern. Every other section 34 is bent up into a half-hexagon shape, while the intermediate sections 32 are bent down into a similar shape forming a double reverse corrugate pattern. The half-hexagons preferably are provided with a plurality of mounting holes 36. FIG. 5(b) shows a plan view of the double reverse corrugate metal.

Figure 6A:
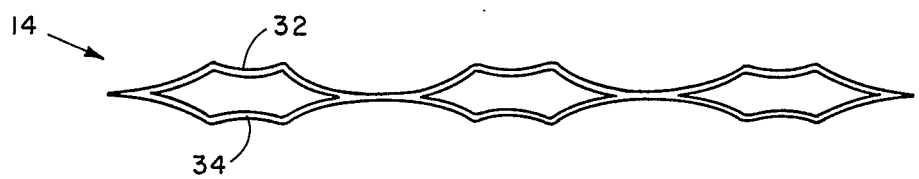
FIGS. 6(a) and 6(b) are elevational views showing how and in what manner the of FIG. 5 deforms.

As the double reverse corrugate material is compressed, the half hexagons 32 and 34 are bent plastically and further deform at the 1/6 initial bend points. If the ends are unconstrained, the material tends to lengthen as shown in FIG. 6(a). It has been found that at about eighty-two (82) percent deformation, the double reverse corrugate metal with ends free has absorbed about six hundred seventy (670) pounds per cubic inch and exhibits a stress-strain curve that is free of high initial peaks and sudden drop offs.

Figure 6B:
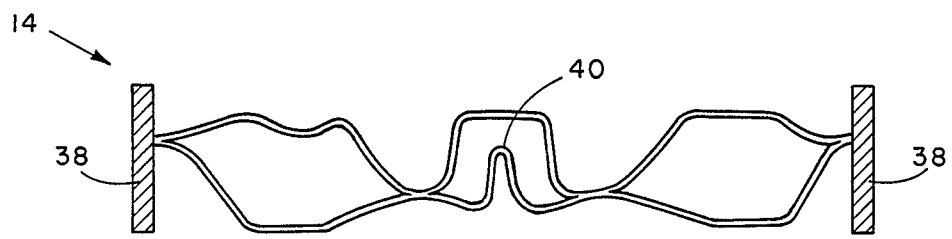

FIG. 6(b) shows the manner of deformation of the double reverse corrugate metal with ends constrained as at 38 by any suitable means such as a metallic enclosure. Considerable pressure is required to initiate plastic deformation in the constrained case because folding occurs as illustrated at 40. The flat portions of the arches start to curve up or down as folds form progressively. The steepest pressure decrease occurs after a fold has developed on every downward arch on the centerline of the double reverse corrugate metal. The constrained double reverse corrugate metal absorbs more than twice the energy absorbed in the unconstrained case but the stress-strain curve has a high initial peak and a sudden drop off which is undesirable in a shock mount. This however could be avoided by selectively precompressing the material. It has been found that the deformation behavior of the double reverse corrugate metal uniformly absorbs mechanical energy over a broad frequency band thus avoiding the potentially deleterious effect of selective frequency passing of the prior art devices.

In both embodiments, the first linear means for elastically deforming suitably may comprise any one of a number of commercially available linear springs such as metallic helical springs or rubber springs. It is preferred, however, springs as shown and described in U.S. Pat. No. 4,190,227 to Belfield et al., incorporated herein by reference, be utilized for the first linear means 12 of the present invention.

Figure 7:
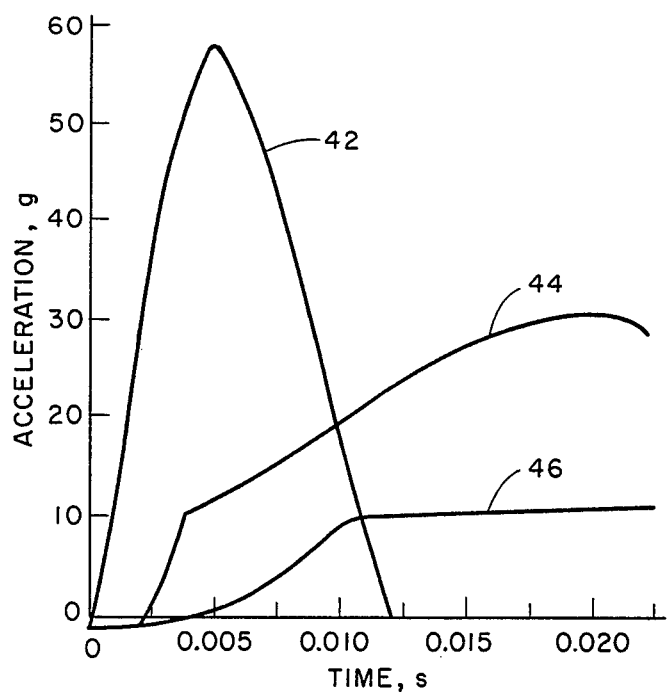
FIGS. 7 and 8 are graphs useful in explaining the operation of the present invention.
Figure 8:
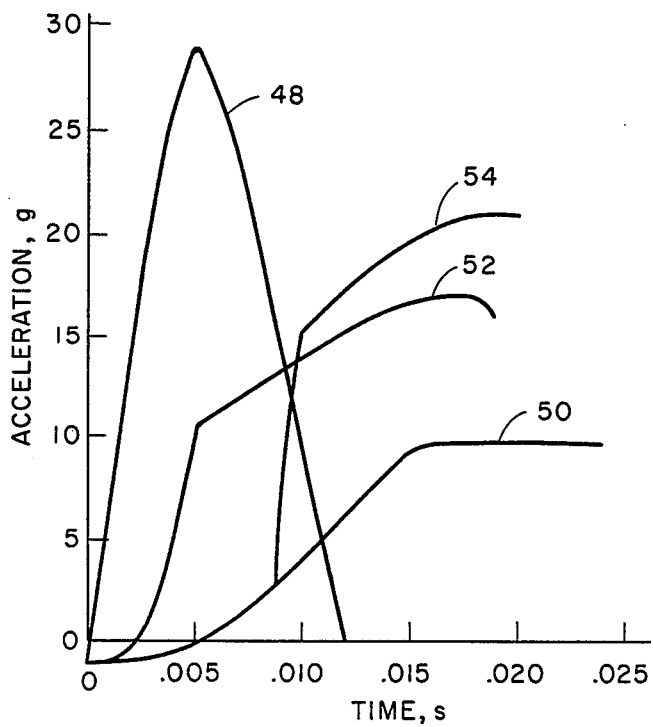

The protection afforded by the combination energy absorbing foundation of the present invention is illustrated in FIGS. 7 and 8. In FIG. 7, the base input is designated at 42, which is the base acceleration which the unprotected equipment would see if it were rigidly attached to the support 18 where the mechanical energy 20 is applied. The peak acceleration is 58g. With the parallel shock mount, 31g is transmitted to the equipment as shown by the curve 44; with the series mount, only 10g is transmitted as shown by the curve 46.

In FIG. 8, the maximum input is 29g as shown by the curve 48. The best protection is provided by the series arrangement as shown by the curve 50; curve 52 shows the parallel system where "a" equals zero (0), and curve 54 shows the parallel system where "a" equals "0.25". The parameter $y_r$ is the maximum deformation obtained; e.g. for curves 50, 52 and 54 of FIG. 8, the maximum deformation, $y_r$, has values 1.115 inches, 0.433 inch and 0.667 inch, respectively. The results clearly show that there is a tradeoff between maximum acceleration and maximum deflection: acceleration is decreased while deformation is increased. To limit deflection, the parallel system clearly has an advantage over the other systems.

It should be noted that all the energy absorbing capacity of the configurations of the two embodiments of the present invention does not need to be used during one shock. They could be designed to use, for example, ⅓ of their capacity for each of three separate shocks. It should also be noted that the embodiment which uses the side loaded tubes may be straigtened and rotated after initial deformation and thus used repeatedly for subsequent shocks.

In summary, there has been disclosed an energy-absorbing foundation that provides both large and small scale absorption of mechanical energy over a broad frequency band using a combination of linear and non-linear elastic and plastic energy-absorbing means positioned between a region where the energy arises another region where personnel and property may be located. The linear and non-linear energy absorbing means may be connected in series or in parallel and act as a mechanical fuse and shock snubber, respectively.

One embodiment uses a double reverse corrugate metal and another embodiment uses side loaded tubes as the non-linear energy absorbing component of the disclosed energy-absorbing foundation. Elastic springs may be used with both embodiments as the linear energy absorbing component.

It is to be clearly understood that many modifications of the presently disclosed invention may be effected without departing from the inventive concept.

What is claimed is:

1. An energy absorbing foundation positioned between rigid support and a foundation member that uniformly absorbs mechanical energy over as broadband of mechanical energy frequencies and a wide latitude of mechanical energy amplitudes, comprising:
   first linear means including a linear spring positioned between said rigid support and said foundation member for elastically deforming in response to mechanical energy; and
   second non-linear means including a plurality of side-loaded rings, coupled to said first linear means, for plastically deforming in response to mechanical energy;
   wherein said first means serves to attenuate small scale vibrations and said second means serves to attenuate large scale vibrations.

2. An energy absorbing foundation that uniformly absorbs mechanical energy over a broadband of mechanical energy frequencies and a wide latitude of mechanical energy amplitudes, as recited in claim 1, wherein said first linear means is conneced in series with said second non-linear means for providing a mechanical fuse.

3. An energy absorbing that uniformly absorbs mechanical energy over a broadband of mechanical energy frequencies and a wide latitude of mechanical energy ampltidues, as recited in claim 1, wherein said first linear means is connected in parallel with said second non-linear means for providing a shock snubber.

4. An energy absorbing foundation that uniformly absorbs mechanical energy over a broadband of mechanical energy frequencies and a wide latitude of mechanical energy amplitudes, as recited in claims 2 or 3, wherein said plurality of side-loaded rings of second non-linear means have such a ductility that they do not crack when deformed.

5. An energy absorbing foundation that uniformly absorbs mechanical energy over a broadband of mechanical energy frequencies and a wide latitude of mechanical energy amplitudes, as recited in claim 4, further including means for holding said plurality of metal rings of said second non-linear means such that said mechanical energy may be applied to said plurality of rings in three directions to produce: compression, in the direction of a diameter of one of the said plurality of rings; shear, tangent to the surface of the ring of said plurality of rings and parallel to the axis of said plurality of rings; and roll, tangent to the surface of said plurality of rings and perpendicular to the axis of said plurality of rings.

6. An energy absorbing foundation that uniformly absorbs mechanical energy over as broadband of mechanical energy frequencies and a wide latitude of mechanical energy amplitudes, as recited in claim 5, wherein said mechanical energy deforms said plurality of rings of said second non-linear means such that inelastic deformations form at quarter points thereof.

* * * * *